(12) United States Patent
Hueter et al.

(10) Patent No.: US 9,094,262 B2
(45) Date of Patent: Jul. 28, 2015

(54) FAULT TOLERANCE AND MAINTAINING SERVICE RESPONSE UNDER UNANTICIPATED LOAD CONDITIONS

(71) Applicant: CERTONA CORPORATION, San Diego, CA (US)

(72) Inventors: Geoffrey J. Hueter, San Diego, CA (US); Steven C. Quandt, Encinitas, CA (US); Noble H. Hueter, San Diego, CA (US); Dane N. Ruyle, San Diego, CA (US)

(73) Assignee: CERTONA CORPORATION, San Diego, CA (US)

( * ) Notice: Subject to any disclaimer, the term of this patent is extended or adjusted under 35 U.S.C. 154(b) by 465 days.

(21) Appl. No.: 13/731,076

(22) Filed: Dec. 30, 2012

(65) Prior Publication Data

US 2013/0173809 A1    Jul. 4, 2013

Related U.S. Application Data

(60) Provisional application No. 61/581,704, filed on Dec. 30, 2011.

(51) Int. Cl.
*G06F 15/173* (2006.01)
*H04L 29/08* (2006.01)
*H04L 29/06* (2006.01)

(52) U.S. Cl.
CPC .......... *H04L 29/08153* (2013.01); *H04L 29/06* (2013.01); *H04L 67/1004* (2013.01); *H04L 67/1034* (2013.01)

(58) Field of Classification Search
CPC .................... H04L 29/08153; H04L 29/06

USPC .................................................. 709/225–226
See application file for complete search history.

(56) References Cited

U.S. PATENT DOCUMENTS

| | | | |
|---|---|---|---|
| 2009/0094000 A1* | 4/2009 | Krishnamurthy et al. | 702/186 |
| 2012/0233321 A1* | 9/2012 | Dreke et al. | 709/224 |
| 2013/0080627 A1* | 3/2013 | Kukreja et al. | 709/224 |

* cited by examiner

*Primary Examiner* — Chris Parry
*Assistant Examiner* — Weiwei Stiltner
(74) *Attorney, Agent, or Firm* — Richard D. Clarke

(57) ABSTRACT

A system and method is disclosed for allocating servers across a large number of applications and for providing a predictable and consistent service response under conditions where the use of the service and associated loads is driven by unknown factors. The invention provides fault tolerance within an application through multiple resources per application and fault tolerance across applications by limiting the overlap in resources between applications. The computational load on the service may include both individual processing time due to the complexity of a single request and the number of requests. Complexity may be unpredictable because the service is self-provisioned and may allow service users to create an arbitrary sequence of compound processing steps. The number of requests may vary due to a variety of events, including daily, seasonal, or holidays, or factors driven more directly by the user of the service, such as sales, advertising, or promotions. The invention throttles server loads to provide managed degradation of application processing. The system has application in personalization, behavioral targeting, Internet retailing, personalized search, email segmentation and ad targeting, to name but a few applications.

23 Claims, 10 Drawing Sheets

Fig. 4

|  | Server 1 | Server 2 | Server 3 | Server 4 | Server 5 |
|---|---|---|---|---|---|
| Application 1 | X | X |  |  | X |
| Application 2 |  | X | X | X |  |
| Application 3 |  |  | X | X | X |

FAULT TOLERANCE AND MAINTAINING SERVICE RESPONSE UNDER UNANTICIPATED LOAD CONDITIONS

FIELD OF THE INVENTION

The present invention relates to managing the infrastructure of web-based services, including web farms and virtualized servers. Particularly, the invention relates to allocating network and computing resources and managing service response degradation to have the least impact on service users. The invention provides a means of non-redundant server allocation and throttling service processing. The system has application, in personalization, behavioral targeting, Internet retailing, email, segmentation and ad targeting, to name but a few applications.

BACKGROUND OF THE INVENTION

The present invention relates to the management of pooled resources to support multiple clients and applications. When there are multiple applications, it is beneficial to have those applications share the same resources. This is because different applications may have different loads at different times or may have different memory configurations, or may otherwise consume resources in a variable way that results in increased effective load, capacity if the resources are shared. This reduces the inefficiency of providing dedicated resources to each application in anticipation of each application's individual peak load, vs. the inefficiency of providing dedicated resources that will mostly be idle during non-peak periods (the so-called "assigned parking problem"). While assigning multiple applications to the same resources levels the peaks of normal variable loads, it does not handle the case where one application has an unexpected overload that cannot be handled by the resource pool.

This can occur, for example, when the consumers of the system self-provision resource intensive requests, whereby the complexity may be unpredictable because the service is self-provisioned and may allow service users to create art arbitrary sequence of compound processing steps. The number of requests may also vary significantly due to a variety of events, including daily, seasonal, or holidays, or factors driven more directly by the user of the service, such as sales, advertising, or promotions. In this case we desire some configuration that retains the benefits of load balancing shared resources, while at the same time limiting the exposure of one application to another application's overload.

The present invention also relates to load-balancing, whereby the requests to the service are managed through a single IP address but then distributed internally to one of a group of servers, or web farm. The web farm, may be physical or virtual. Particularly as resources become virtualized, it is possible to dynamically create large virtual web farms. As these web farms become larger it becomes both more difficult and more important to be able to maintain cost-efficient configurations while still maintaining adequate resource headroom for peak loads. The present invention addresses the shortcomings of existing server management configurations to both minimize the exposure of one application to another, through partial redundancy, and to limit the consumption of resources within an application. This allows the web service to be scaled to large numbers of client applications, with complex processing logic, and dynamic and unexpected loads.

SUMMARY OF THE INVENTION

In accordance with the present invention, a method and system is presented for distributing the load from separate applications across multiple shared resources, whereby the resources allocated to one application are partially but not fully overlapping with other applications. This occurs, for example, with web-based services, which are sometimes described as "software as a service", or SaaS. In the event that one application has an unexpected and unsupportable load that might impact the experience of an end user, this configuration allows the other applications to continue to function normally by directing their requests to non-overlapping servers or other resources. The present invention also mitigates the degradation of the service by throttling the processing steps within the service to provide a "good enough" result that is returned in a predictable and acceptable period of time.

An object of the invention is to provide a web-based service that, can support multiple client applications within a common service infrastructure.

Another object of the invention is to optimally distribute the applications to resources in a way that maximizes the headroom available to each application, while at the same time minimizing the exposure of one application to any other application in the event of an unexpected load on another application.

Another object of the invention is to autonomously provision additional resources, such as virtual servers or cloud servers, when the service load exceeds a critical threshold, and conversely to un-provision resources when they are no longer needed, thereby reducing the cost of operating the service without affecting quality of service.

Another object of the invention is to support client applications that are self-provisioned and that may contain a number of complex processing steps, including lookup tables, business rules, predictive model processing, and database retrieval.

Another object of the invention is to provide a predictable service response time regardless of the complexity of the self-provisioned logic.

Another object of the invention is to automatically reduce the time spent on any one step in a complex logic chain in order to increase the likelihood that the response will be filled within the target response time.

The present invention is a system and method for allocating resources and managing logic processing. A key improvement of the invention over other systems is that the system can automatically allocate and manage resources based on measured resource consumption. This autonomy allows the system to support large numbers of client applications, whereby each application may have complex self-provisioned logic and may have unexpected loads.

BRIEF DESCRIPTION OF THE DRAWINGS

FIG. 4 depicts an embodiment of the system to distribute applications to a set of servers.

DETAILED DESCRIPTION OF THE DRAWINGS

Figure 1:
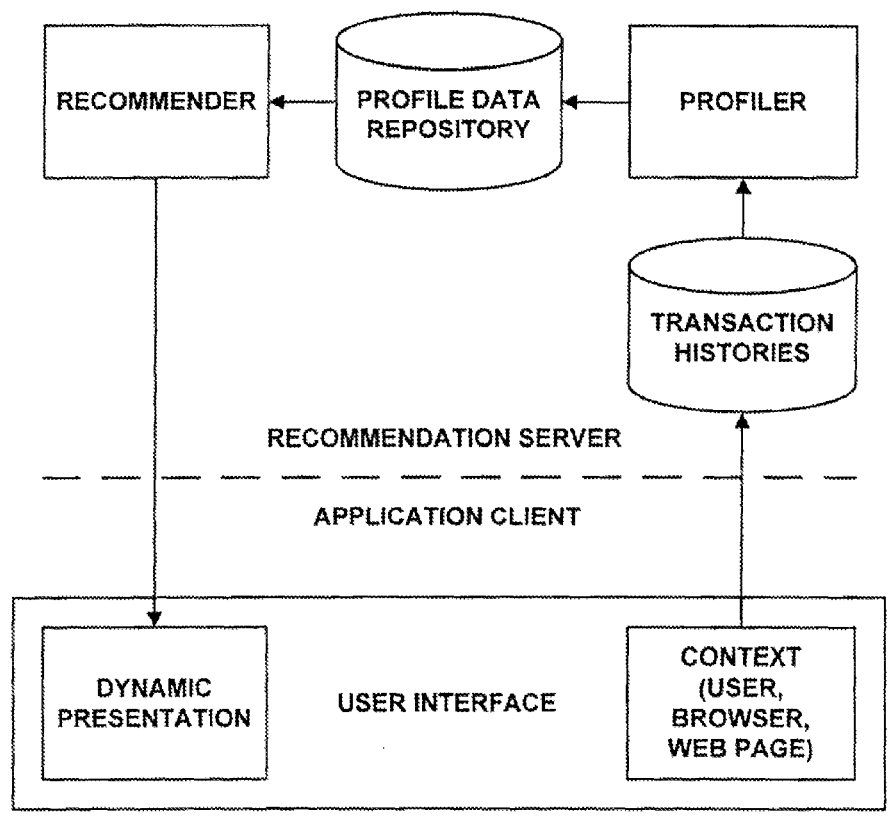
FIG. 1 depicts the principal components of the system.

FIG. 1 shows the principal components of the system. As shown in the figure, there is an application client and a recommendation system. The end-user interface can be implemented using a variety of devices, including a personal computer, an in-store kiosk, a personal digital assistant (PDA), a mobile phone, a mobile tablet, a set top box, a wireless device or an ordinary phone with voice capability. The recommendation system is typically a computer or collection of computers within a network or across the Internet. As an alternative embodiment the recommendation request, can be made through an intermediate server, which then renders the recommendations to the user interface.

A subject interacts with the user interface. The user interface makes a request to the recommendation system, which returns personalized content based on the context of the request, where the context of the request includes the identity of the subject, the specific type of system, such as desktop computer or mobile phone, the physical location of the subject, the specific page of the application being viewed, or any other known attributes that may be relevant to determining the interest or intent of the subject. In addition to requesting and displaying recommended content, the user interface submits information on the activity of the subject, including whether the subject completes a desired or targeted outcome, such as making a purchase, booking a hotel, completing a survey, accepting an offer, or any other conversion event for the site. The recommendation system stores all of the recommendation requests and subject outcomes, which are used to build subject profiles in accordance with the present invention.

Figure 2:
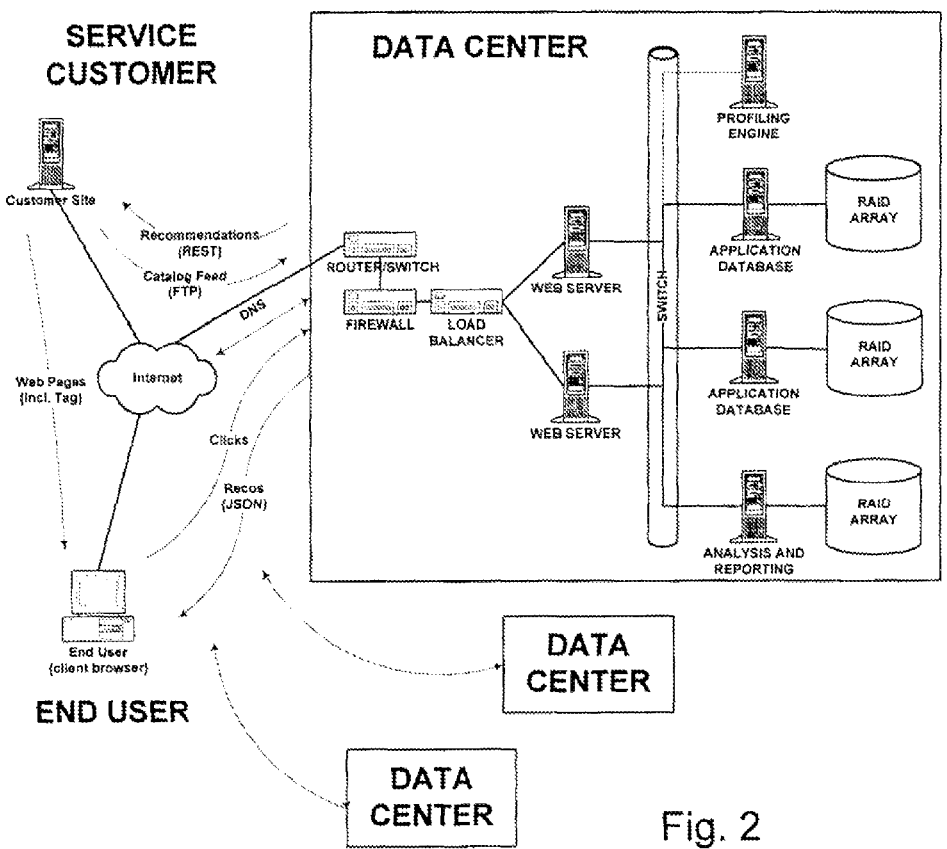
FIG. 2 depicts the distribution of components across multiple computers on a network.

FIG. 2 shows an embodiment of the delivery of the system over the Internet. The end use application (Service Customer) is a website that is external to the system and that communicates with the system via web services from the customer website or directly from the customer website's end user's client browser. As shown, the system may be distributed across multiple computers on a network. This consists of one or more web servers (or web farm), which collect data and process content recommendation requests. The web servers pass data to one or more application databases via a message queuing system that allows the web servers to continue processing while the much slower database servers feed the data into permanent storage, such as non-volatile RAM, direct-attached RAID array, network attached storage (NAS), or storage area network (SAN). Additionally, a profiling engine retrieves affinity and other data from an application database and uses the data to generate the segmentation models, which are then stored back into the application database.

The predictive segmentation models, content metadata, and any additional business rules logic are also cached on the web servers for faster match generation during live operation. In order to process an arbitrarily large number of visitors the web servers are multiplexed using a load balancer, which makes a collection of web servers appear to the Internet as a single server. Also, when a web server becomes unavailable or out of service for any reason, the load balancer automatically transfers traffic to another server. This provides a high level of fault tolerance for the system. In order to provide additional service availability the database and web servers can be replicated to other data centers, through geographic load balancing. Note that in this embodiment, the service has been distributed over multiple servers. In an alternative embodiment all of the functions of the service could be put onto a single or smaller set of servers without a substantive change in the overall functionality of the service. This embodiment also supports multiple Service Customers making simultaneous requests to the web services by allocating different requests to different subsets of servers in the server farm and by creating a separate database for each Service Customer.

Figure 3:
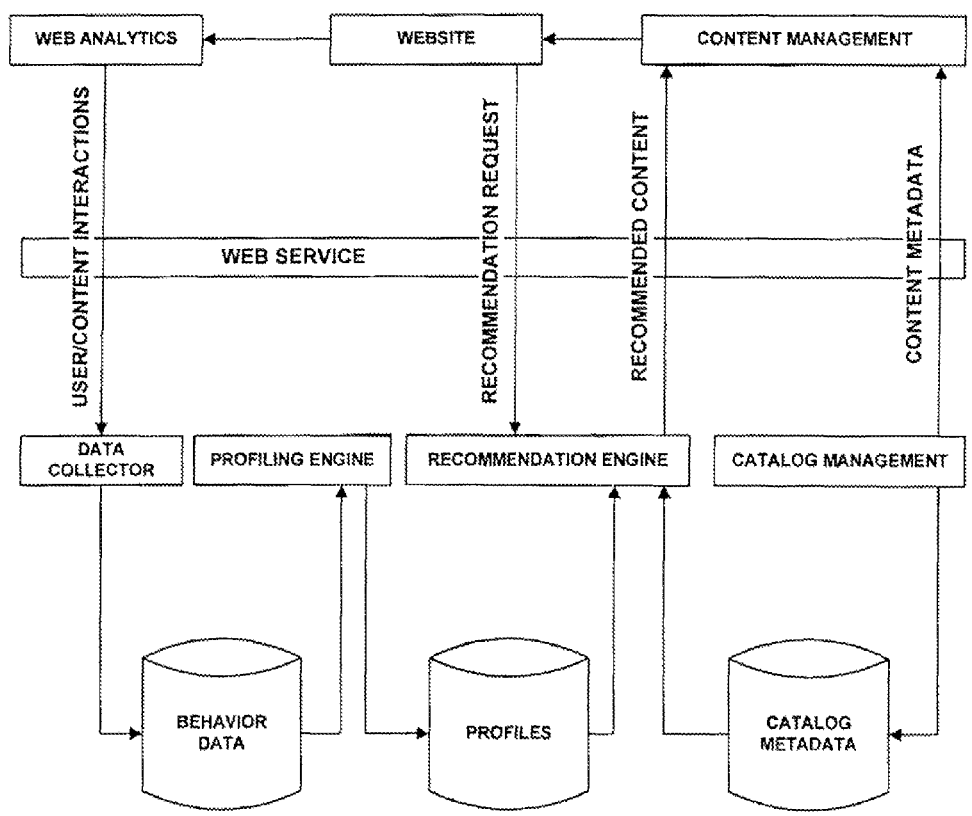
FIG. 3 depicts an embodiment of the system using web services on a distributed network.

FIG. 3 shows an embodiment of the system using web services on a distributed network. The website, content management, and web analytics modules are external to the system and communicate with the data collector, profiling engine, recommendation engine and catalog management modules via web services (REST or SOAP), such as using XML or JSONP. The website requests information from the content management module and displays it on the browser. The browser generates user context and behavior data via the web analytics module.

This can be done on the browser itself using JavaScript or on the web server using web logging or packet sniffing, or using other data transfer mechanisms as appropriate to the service customer. Regardless of how this is done, the web analytics submits data via a web service call to the data collector. To display customized content the website requests information from the recommendation engine. The output of the recommendation engine is fed through the content management module to get the display attributes of the recommended content and then displayed on the website.

The content management module not only generates content for the website, it also feeds content information (metadata) to the catalog management module, which stores both information necessary to display content and descriptive attributes that may be applied to filter targeted content according to website-defined business rules or objectives. When a request is made to the recommendation engine for targeted content, the recommendation engine combines the subject profiles with the catalog metadata to find the optimal content subject to any business rules, or other restrictions, put on the results.

FIG. 4 depicts an embodiment of the system to distribute applications to a set of servers. In this case there are three applications that need to be distributed across 5 servers. One way to do this would be to put all three applications on all five servers. The problem with, this approach is that if any of the applications goes out of control, the other two applications would be adversely affected as well. Instead, if each application is put on a separate subset of servers apart from the other present servers, if an application goes awry, then the other applications will still be operating on unaffected servers, whereby the load balancer would automatically route traffic away from the affected servers to the unaffected servers.

More generally, consider that there is a pool of servers $\{K\}$> which may be virtual or physical. Each server has a load capacity $F_k$ and a memory capacity $G_k$ (and other resource capacity $H_k$). Consider also a pool of applications $\{N\}$, which each consume an average load $L_i$ and memory $M_i$ (or other resource $R_i$). In order to service the load $L_i$, the application needs to be distributed over a minimum number of servers $S_i$, where $S_i < K$. In the simplest case, assume that $L_i$ and $M_i$ (and $R_i$) are the same for every application, and that the server capacities are the same for every server. In that case the allocation of resources is determined by distributing each application across a number of servers $S<K$, such that the set of servers is different for each application. Assuming that $N*S>K$, the overlap between applications is $(2*S)-K$, and the maximum number of clients that can be supported is $K!/(K-$ S)!/S. To quantify how the system is fault tolerant, the best case capacity, that is all applications are behaving normally, is S*K/(N*S)=K/N (note that the result is independent of S), whereas the worst case capacity, which occurs when a shared application is overloaded, is Worst case capacity=Best case capacity−Overlap=K/N−[(2*S)−K]=K−S.

The optimal ratio of servers per client to total number of servers is 0.5 times the total number of servers, plus one added for an odd number of servers.

Figure 5:
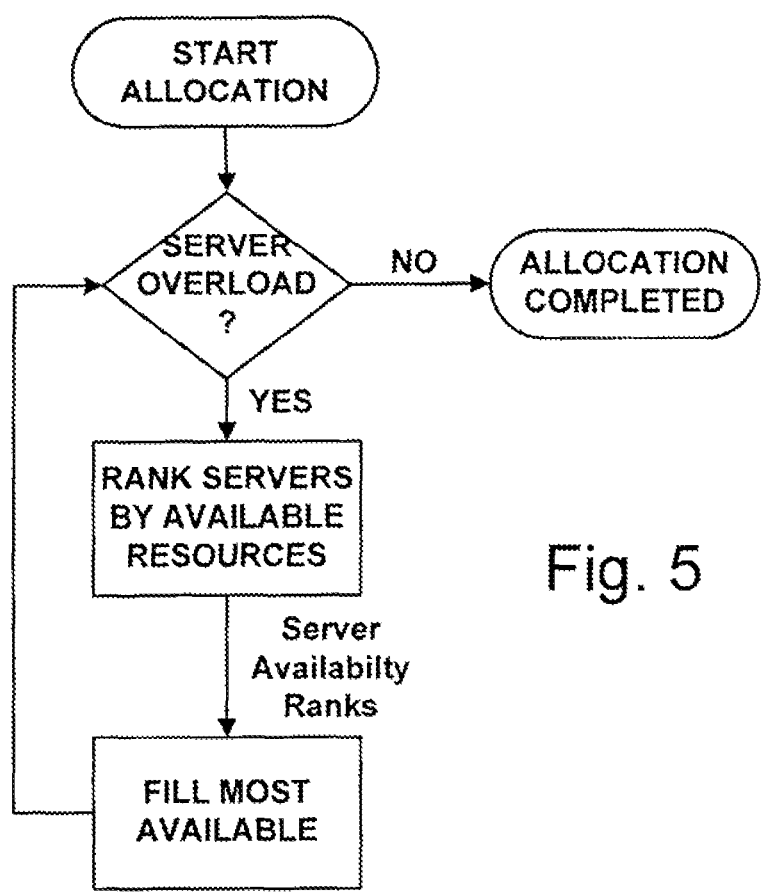
FIG. 5 describes the processing flow for the case of allocating applications across unequal resources.

FIG. 5 describes the processing flow for the case of allocating applications across unequal resources. Considering the more realistic case that all applications and resources will not be equal, it is a key characteristic of the invention that it can adaptively distribute applications to available resources to provide both balanced load and fault tolerance of other applications being adversely affected by a runaway application. First the applications are initialized across the server pool, such as by using the method described in FIG. 4. Each server is monitor to assess its load. If any server exceeds a specified load tolerance, such as exceeding 50% CPU utilization, then the applications are re-balanced by first ranking die servers by resource utilization and then moving one or more applications from the most impacted server to the least impacted server. This is repeated until the excess load condition is eliminated.

Figure 6:
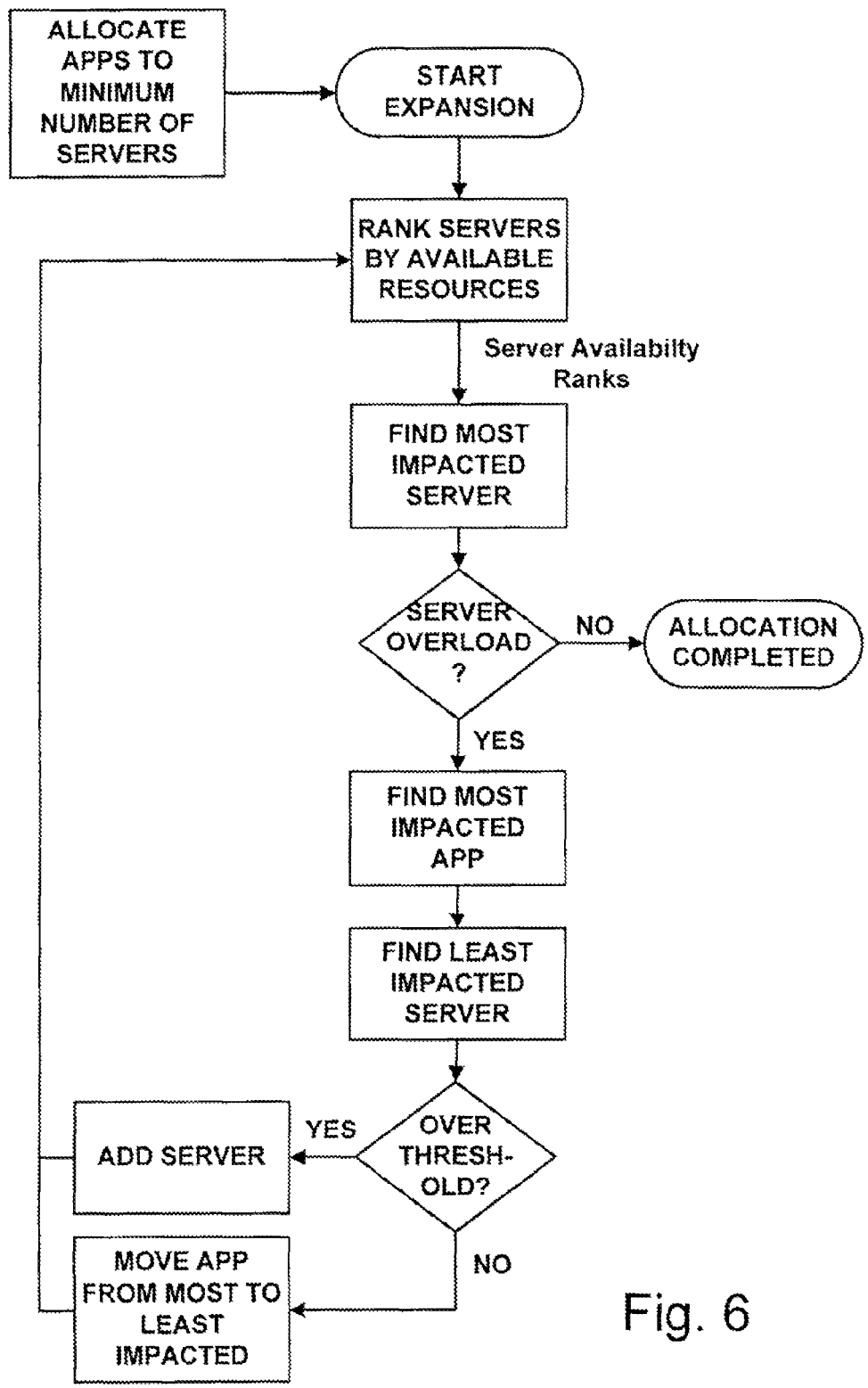
FIG. 6 depicts the embodiment of the system to autonomously add resources to a server pool.

FIG. 6 depicts the embodiment of the system to autonomously add resources to a server pool. This condition applies, for example, to the case where virtualized servers, including cloud-based servers, can be provisioned in response to load conditions. First, the applications are allocated to a minimum number of servers according to FIG. 4, such that each application has multiple redundant servers and is only partially overlapping with other applications. Next, the servers are monitored, such as for percentage CPU utilization. If the most impacted server, as measured by CPU utilization exceeds a threshold, such as greater than 50% utilization, then the system identifies the most impacted application, as measured by average CPU utilization across that application's server pool.

If the least impacted server is below a specified threshold, for example 30% CPU utilization, then the most impacted application is expanded to that server, while observing the avoidance of redundant assignment of two applications to the same set of servers. If the least impacted server is above the threshold, then a new server is introduced into the pool and the roost impacted application is expanded to that server.

The server pools can be contracted by applying the system in reverse. If the most impacted server falls below a given threshold, such as 20% CPU utilization, then the least, impacted server would be removed from the pool and the resource rankings re-calculated. Removal of unneeded servers is particularly critical with provisioned resources, such as cloud-computing, where there is a cost associated with the use of a server that can be avoided by using the invention.

Figure 7:
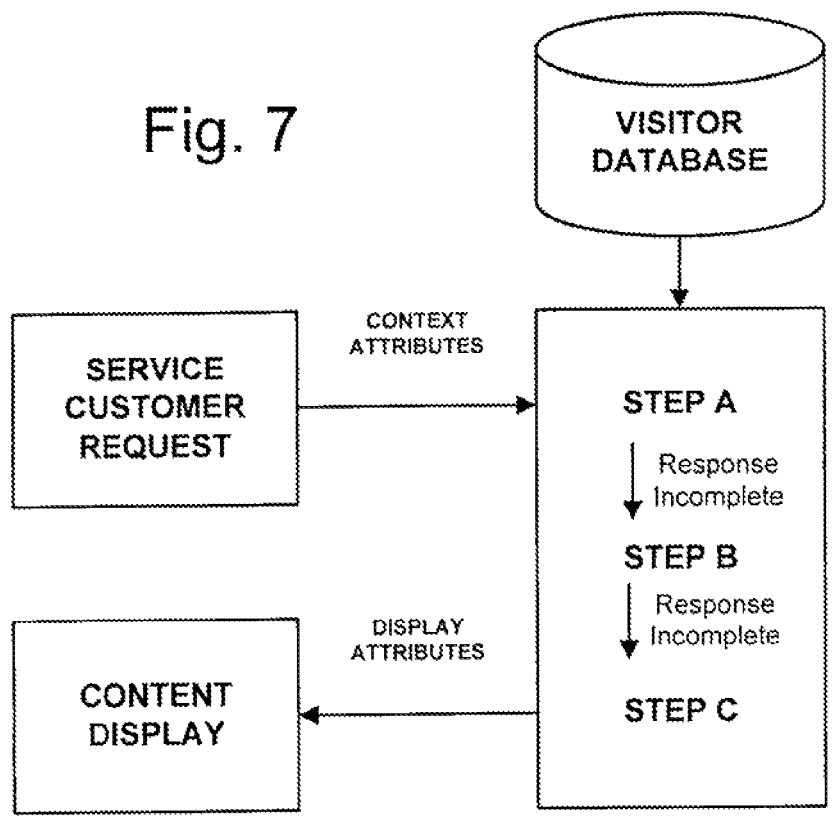
FIG. 7 depicts the embodiment of a complex logic system with multiple steps.

FIG. 7 depicts the embodiment of a complex logic system with multiple steps. In addition to optimizing the distribution of applications across servers as described above, the invention also addresses the fault tolerance of an application within its own set of servers and abnormal load conditions, in particular the invention considers the case where the service consists of a sequence of complex logic steps. The invention provides a predictable and controlled time of response across widely varying complexities of request and numbers of requests. For example, in the embodiment of a recommendation system, a single request may consist of a sequence of multiple strategies, with each strategy consisting of a set of input data, or context, including context, information, such as visitor history, that might be retrieved from a database; a data model, which produces a candidate result set based on the inputs; and a set of business rules, which filter the candidate result set to the final set. The entirety of the final result set may be filled progressively by the sequence of strategies, such that if the first strategy returns fewer than the number requested, then the system requests the difference from a second strategy and so on.

Figure 8:
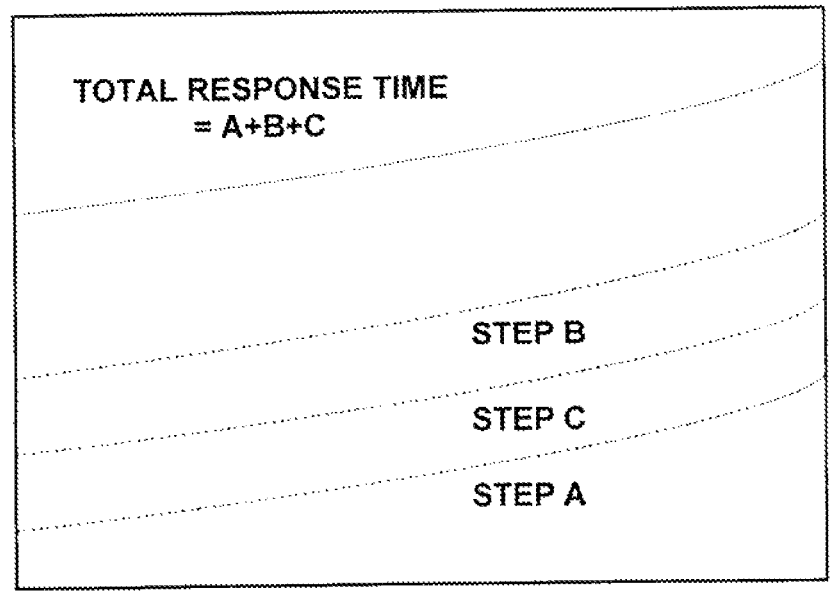
FIG. 8 depicts the response time as a sum of the response times of the individual logic steps and the server load.

FIG. 8 depicts the response time as a sum of the response times of the individual logic steps and the server load. For example the logic sequence shown in FIG. 7 consists of three steps, or strategies. The total processing time would then consist of the combined processing time of each of the steps, plus any time for data retrieval or other wraparound, processes. In addition, as the load on the server increases, then the time for each step and hence the overall processing time, will increase. In the extreme case, the processing time will become so long as to appear that the service is unavailable, which will impact the other operations of the requesting application and the associated experience of the end user.

Figure 9:
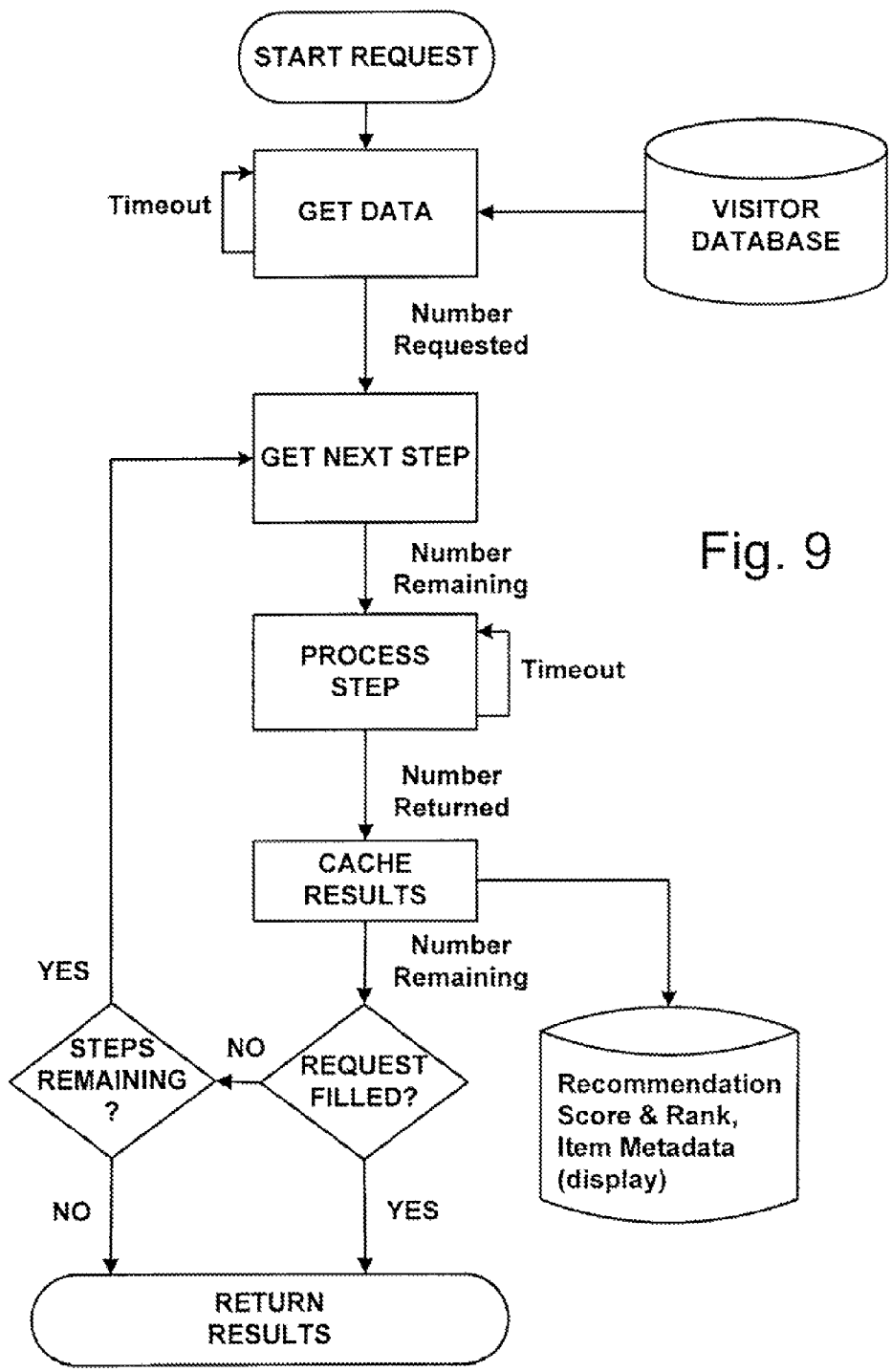
FIG. 9 describes the processing flow to limit the total processing time and the individual logic steps.

FIG. 9 describes the processing flow to limit the total processing time and die individual logic steps. As shown in FIG. 9, the invention controls the response time by limiting the processing for each step as follows:
1. The amount of time allowed for the entire processing of the sequence of strategies, or scheme, may be limited to an acceptable maximum period of time, such as 1000 ms. The system will return whatever results have been calculated to that point.
2. The amount of time in retrieving the data inputs may be limited to an acceptable maximum period of time, such as 100 ms. This may be, for example, the time that it takes to make a request to a database and return a recordset. As the recordset is processed, processing is terminated after the defined processing period. Note that this is not a timeout per se, because unlike a timeout, the process returns whatever results have been retrieved to that point, as opposed to the process being terminated, without a result. This is particularly useful in cases where the number of data inputs that could be retrieved varies widely from request to request (for example, the number of past purchases made by a shopper), particularly if there are bots, agents, or other automated processes that may produce an abnormal (and presumably false) number of items.
3. The amount of time allowed for processing of each strategy is limited by the number of items remaining to be filled for the scheme, for example (Time Allowed) =0.5*(Number of Items for the strategy)/(Number remaining for the scheme)*(time remaining for the scheme).
4. A strategy may include an ensemble of models, or sub-methods. The amount of time allowed for each sub-method may be set to allow time for subsequent sub-methods, for example (Time Allowed)=0.9*(time remaining for the strategy).

Figure 10:
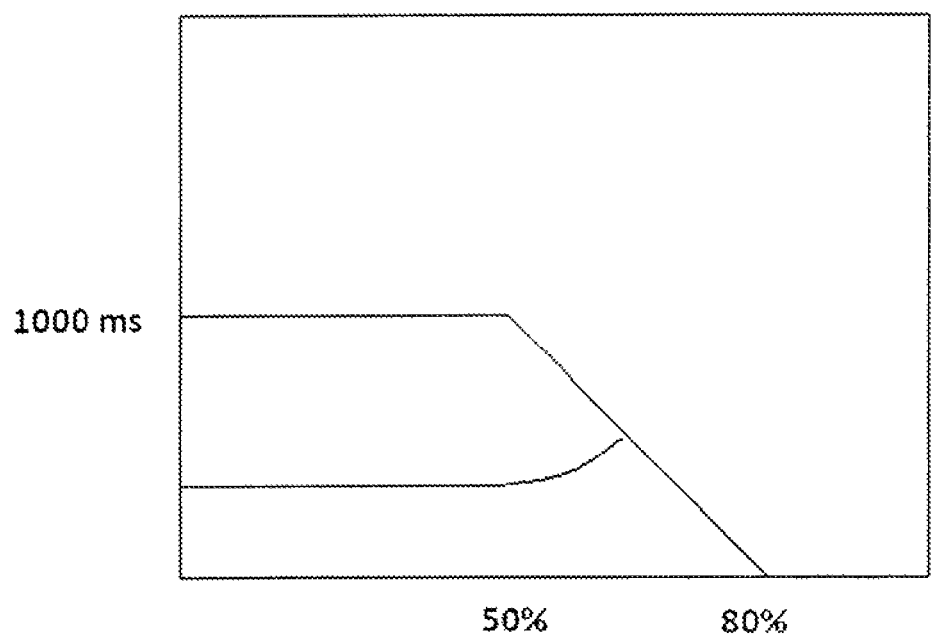
FIG. 10 depicts the effect of the invention, on mitigating runaway service response times.

FIG. 10 depicts the effect of the invention on mitigating runaway service response times using the methodology described in FIG. 9. A key feature of the invention is that it regulates the amount of time allocated to a request based on the overall load conditions of the server. The overall load conditions may be measured by the CPU utilization. As the CPU exceeds a certain limit, requests will begin to take longer due to the overhead of processing multiple simultaneous requests. If unchecked, further increasing the load will lead to unacceptable response times, creating an effective outage of the service. The invention mitigates this condition by decreasing the allotted processing time as the CPU utilization increases. For example, 1. Maximum allowed time=1000 ms, up to 50% CPU utilization.
2. Maximum allowed time=1000*[1−(CPU−50)/30], if greater than 50% CPU utilization.

For the example above, the allowed time effectively goes to zero at 80% CPU utilization. Although this means that the service will not return any results, this may preferable to the case of unacceptable response time, because the service may only provide a subset of the overall content of a larger service, and receiving the content of the larger service in a timely fashion provides and better experience than receiving the full content with an unacceptably slow response. In this way the invention provides a managed, graceful degradation of service response under conditions that would otherwise result in the service becoming non-responsive due to overload.

The invention may be used on a single server or a collection of servers, or server farm, whereby the load of the service is shared by the servers according to their processing capacity and availability. Usually, a network component called a load balancer is used to distribute the incoming requests to the various servers. When the invention is used in conjunction with a load balanced server farm, the mechanism used for balancing the load becomes important to avoid instability of the service. For example, a load balancer may use one of the following strategies:

1. Round robin. This is the simplest technique, and may work acceptably when all servers are of equal capacity (in terms of processing throughput) and availability. If either of these conditions is not met, then response times may be greater than optimal because of equal use of slower servers or making requests to servers that may be having operational difficulties.
2. Least response. This technique may provide optimal response for farms of either equal or unequal server capacities and automatically directs traffic away from servers that may be operating abnormally slowly. However, this approach may be unstable with the invention because as the response time reaches the maximum allowed for a specified CPU utilization, the response time will artificially decrease due to the throttling mechanism of the invention. The decreased response time, relative to other servers in the farm at near but slightly less load, will make the server appear to have more capacity, thereby increasing the load, then the CPU utilization, and then decreasing the response time, and attracting more requests that would otherwise be balanced on tire other servers. In practice this instability does not occur, because of the hysteresis in the load balancer and the amount of time spent in the operations that wrap around the operations to which the throttle is applied.
3. Least connections. This technique replicates the least response approach under normal conditions, because each request takes on average the same amount of time, and the number of connections is proportional to both the number of requests and the processing time for a single request. To put it another way, the load balancer distributes traffic loads so that each server has the same total processing, whereby the total processing is the sum over all requests of the processing time of each request. When used with the invention, this technique will continue to distribute traffic to all servers because the decreasing response time of the overloaded server is balanced by the reduced requests (connections) on the other servers.

The above application embodiments are for example only. The invention does not restrict the design and implementation of the application in any way, as long as the interface to the recommendation engine matches the protocols defined by the interface guidelines. A key aspect of the invention is that, unlike other methods, it automatically allocates disparate application loads to a pool of servers (web farm).

Another aspect of the invention is that it isolates and minimizes the exposure of one application to another in the event of a single application fault or abnormal load.

Another aspect of the invention is that it allows automatic expansion and contraction of resources, which reduces the cost of operating the system.

Another aspect of the invention is that it supports large numbers of applications and servers.

Another aspect of the invention is that it provides predictable response times.

Another aspect of the invention is that it is fault-tolerant to inefficient or ineffective logic steps.

Another aspect of the invention is that it ensures that the system always responds under heavy loads and mis-configured logic.

Another aspect of the invention is that provides a "good enough" result with acceptable response times.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A computer implemented system for providing a fault-tolerant web-based service, comprising:
    one or more sets of servers, including one or more application clients, one or more data centers and one or more service customers, having one or more end-user interfaces together comprising a service infrastructure wherein said set of servers $\{K\}$, may be virtual or physical, and further wherein each server has a load capacity and a memory capacity, which each consume an average load $L_i$, memory $M_i$ and other resource $R_i$, whereby the allocation of resources is determined by distributing each application across a number of servers S<K, such that the set of servers is different for each application and N*S>K, the overlap between applications is (2*S)−K, and the maximum number of clients that can be supported is K!/(K−S)!/S, where N equals the number of applications and S≠0;
    a load balancer in communication with said set of servers, for making a collection of web servers appear to the Internet as a single server, and when a web server becomes overloaded, unavailable or out of service, said load balancer transfers traffic to another server;
    a response manager that records response times of individual service requests;
    a load monitor that records the level of consumption of an individual resource within the service infrastructure;
    a logic processor that processes a sequence of strategies to fulfill a service request;
    a service throttle that controls the amount of processing time allocated to a given logic step; and a server allocation module that assigns applications to servers;

whereby said system manages resource allocation and service request response time.

2. The computer implemented system for providing a fault-tolerant web-based service according to claim 1, wherein said end-user interface can be implemented using a variety of devices, including a personal computer, an in-store kiosk, a personal digital assistant (PDA), a mobile phone, a mobile tablet, a set top box, a wireless device or art ordinary phone with voice capability.

3. The computer implemented system for providing a fault-tolerant web-based service according to claim 1, wherein said system uses web services on a distributed network, whereby the website, content management, and web analytics modules are external to the system, and communicate with a data collector, a profiling engine, a recommendation engine and one or more catalog management modules via web services.

4. The computer implemented system for providing a fault-tolerant web-based service according to claim 1, wherein the worst case capacity, which occurs when a shared application is overloaded, is calculated as worst case capacity=best case capacity−overlap=$K/N−[(2*S)−K]=K−S$.

5. The computer implemented system for providing a fault-tolerant web-based service according to claim 1, wherein the optimal ratio of servers per client to total number of servers is calculated as 0.5 times the total number of servers, plus one added for an odd number of servers.

6. The computer implemented system for providing a fault-tolerant web-based service according to claim 1, wherein said load balancer initializes the applications across the server pool, monitors each server to assess its load, then re-balances the applications by first ranking the servers by resource utilization and then moving one or more applications from the most impacted server to the least impacted server if any server exceeds a specified load tolerance, then repeats the re-balancing of applications until the excess load condition is eliminated.

7. The computer implemented system for providing a fault-tolerant web-based service according to claim 6, further wherein said load balancer functions to detect if the least impacted server is below a specified threshold, then expands the most impacted application to that least impacted server, while observing the avoidance of redundant assignment of two applications to the same set of servers, and functions to detect when the least impacted server is above a specified threshold and then introduces a new server into the pool and expands the most impacted application to that newly added server.

8. The computer implemented system, for providing a fault-tolerant web-based service according to claim 7, further wherein said load balancer functions in reverse, whereby if said load balancer detects that the most impacted server fails below a given threshold, then the least impacted server is removed from, the pool and the resource rankings re-calculated.

9. The computer implemented system for providing a fault-tolerant web-based service according to claim 1, further wherein said system addresses complex logic with multiple steps such that in addition to optimizing the distribution of applications across servers, the system also addresses the fault tolerance of an application within its own set of servers and abnormal load conditions.

10. The computer implemented system for providing a fault-tolerant web-based service according to claim 1, further wherein said service throttle that controls the amount of processing time allocated to a given logic step calculates a sum of the response times of the logic steps and the server load wherein said response time is calculated as the combined processing time of each step, plus any time required for data retrieval, plus any other required processing times.

11. The computer implemented system for providing a fault-tolerant web-based service according to claim 10, further wherein said service throttle limits the processing time for each step by limiting the amount of time allowed for the entire processing of the sequence of strategies, or schemes, whereby the amount of time may be limited to an acceptable maximum period of time.

12. The computer implemented system for providing a fault-tolerant web-based service according to claim 10, further wherein said service throttle limits the processing time for each step by limiting the amount of time allowed for retrieving the data inputs, whereby the amount of time may be limited to an acceptable maximum period of time.

13. The computer implemented system for providing a fault-tolerant web-based service according to claim 10, further wherein said service throttle limits the processing time for each step by limiting the amount of time allowed for processing of each strategy, whereby each strategy is limited to the number of items remaining to be filled for a given scheme, wherein a strategy may include an ensemble of models, or sub-methods, each of which are separately allocated a maximum processing time to return the requested number of items before the logic processor continues to the next sub-method.

14. The computer implemented system for providing a fault-tolerant web-based service according to claim 1, wherein said load monitor regulates the amount of time allocated to a request based on the overall load conditions of the server, and further wherein the overall load conditions are measured by server CPU utilization.

15. The computer implemented system for providing a fault-tolerant web-based service according to claim 1, wherein said one or more sets of servers includes a collection of virtual or physical servers, known as a server farm, whereby the load of the service is shared by the servers according to their processing capacity and availability.

16. The computer implemented system for providing a fault-tolerant web-based service according to claim 15, wherein said load balancer is used to distribute the incoming requests said sets of servers within said server farm, whereby the load balancer uses a load balancing strategy for balancing the load to avoid instability of the web-based service.

17. The computer implemented system for providing a fault-tolerant web-based service according to claim 16, wherein said load balancing strategy includes a least response strategy to provide optimal response for server farms of equal or unequal server capacities and to direct traffic away from servers that may be operating abnormally slowly.

18. The computer implemented system for providing a fault-tolerant web-based service according to claim 16, wherein said load balancing strategy includes a round robin strategy, used when all servers are of equal capacity in terms of processing throughput and availability.

19. The computer implemented system for providing a fault-tolerant web-based service according to claim 15, wherein said load balancing strategy includes a least connections strategy to distribute traffic loads so that each server has the same total processing, whereby the total processing is the sum over all requests of the processing time of each request, and whereby the servers may be of unequal capacity in terms of processing throughput.

20. The computer implemented system for providing a fault-tolerant web-based service according to claim 1, wherein said system allocates disparate application loads to a pool of servers within said web farm, to provide predictable response times under conditions of heavy loads and under conditions of mis-configured logic.

21. A computer implemented method for providing a fault-tolerant web-based service, comprising the steps of:
providing one or more sets of servers, including one or more application clients, one or more data centers and one or more service customers, having one or more end-user interfaces together comprising a service infrastructure, wherein said set of servers $\{K\}$, may be virtual or physical, and further wherein each server has a load capacity and a memory capacity, which each consume an average load $L_i$ and memory $M_i$ and other resource $R_i$, whereby the allocation of resources is determined by distributing each application across a number of servers $S<K$, such that the set of servers is different for each application and $N*S>K$, the overlap between applications is $(2*S)-K$, and the maximum number of clients that can be supported is $K!/(K-S)!/S$, where N equals the number of applications and $S \neq 0$;
providing a load balancer in communication with said set of servers, for making a collection of web servers appear to the Internet as a single server, and when a web server becomes overloaded, unavailable or out of service, said load balancer transfers traffic to another server;
providing a response manager that records response times of individual service requests;
providing a load monitor that records the level of consumption of an individual resource within the service infrastructure;
providing a logic processor that processes a sequence of strategies to fulfill a service request;
providing a service throttle that controls the amount of processing time allocated to a given logic step; and
providing a server allocation module that assigns applications to servers;
whereby said system manages resource allocation and service request response time in an automated manner.

22. The computer implemented method for providing a fault-tolerant web-based service according to claim 21, wherein said end-user interface can be implemented using a variety of devices, including a personal computer, an in-store kiosk, a personal digital assistant (PDA), a mobile phone, a mobile tablet, a set top box, a wireless device or an ordinary phone with voice capability.

23. The computer implemented method for providing a fault-tolerant web-based service according to claim 21, wherein said system uses web services on a distributed network, whereby the website, content management, and web analytics modules are external to the system, and communicate with a data collector, a profiling engine, a recommendation engine and one or more catalog management modules via web services.

\* \* \* \* \*